(12) United States Patent
Faik et al.

(10) Patent No.: US 10,688,700 B2
(45) Date of Patent: Jun. 23, 2020

(54) MOLDING TOOL AND METHOD FOR FORMING AND BACK-INJECTING A BENDABLE SHEET

(71) Applicant: Faurecia Innenraum Systeme GmbH, Hagenbach (DE)

(72) Inventors: Othmane Faik, La Wantzeanu (FR); Stephen Bellagamba, Strasbourg (FR)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 213 days.

(21) Appl. No.: 15/853,186

(22) Filed: Dec. 22, 2017

(65) Prior Publication Data
US 2018/0178424 A1 Jun. 28, 2018

(30) Foreign Application Priority Data
Dec. 23, 2016 (DE) .................. 10 2016 226 214

(51) Int. Cl.
*B29C 45/14* (2006.01)
*B29C 33/14* (2006.01)
(Continued)

(52) U.S. Cl.
CPC ........ *B29C 45/14073* (2013.01); *B29C 33/14* (2013.01); *B29C 45/1418* (2013.01); *B29C 45/14065* (2013.01); *B29C 45/14336* (2013.01); *B29C 45/14688* (2013.01); *B29C 45/2606* (2013.01); *B29C 45/14434* (2013.01); *B29C 2045/14081* (2013.01); *B29C 2045/14155* (2013.01); *B29C 2045/14163* (2013.01); *B29K 2023/12* (2013.01); *B29K 2055/02* (2013.01); *B29K 2079/085* (2013.01); *B29K 2709/08* (2013.01); *B29L 2031/3005* (2013.01); *B29L 2031/3008* (2013.01); *B29L 2031/3014* (2013.01); *B29L 2031/3041* (2013.01); *B29L 2031/3475* (2013.01)

(58) Field of Classification Search
None
See application file for complete search history.

(56) References Cited

U.S. PATENT DOCUMENTS 3,363,040 A * 1/1968 Katashi ..................... B44C 5/00
264/278
4,470,786 A * 9/1984 Sano ....................... B29C 33/14
257/E21.504
(Continued)

FOREIGN PATENT DOCUMENTS

DE 3345626 A1 6/1985
DE 10004735 A1 8/2001
(Continued)

*Primary Examiner* — Edmund H Lee
(74) *Attorney, Agent, or Firm* — Faegre Drinker Biddle & Reath LLP

(57) ABSTRACT

This document relates to a molding tool for forming and back-injecting a bendable sheet including a mold that includes a first mold half and a second mold half. The first half is arranged opposite the second half forming a cavity for receiving the bendable sheet and a melt. Further, the mold includes at least one pin for holding the bendable sheet and the pin is retractable in response to a force exerted on the pin by a pressure of the injected melt during back injection.

11 Claims, 5 Drawing Sheets

(51) Int. Cl.
  *B29C 45/26* (2006.01)
  *B29L 31/30* (2006.01)
  *B29L 31/34* (2006.01)
  *B29K 709/08* (2006.01)
  *B29K 23/00* (2006.01)
  *B29K 55/02* (2006.01)
  *B29K 79/00* (2006.01)

(56) References Cited

U.S. PATENT DOCUMENTS

| | | | |
|---|---|---|---|
| 6,309,579 B1 * | 10/2001 | Koyama | B29C 45/14073 264/278 |
| 7,276,197 B2 * | 10/2007 | Kaminski | B29C 45/14073 264/247 |
| 8,070,993 B2 * | 12/2011 | Keys | B29C 45/14073 264/40.4 |
| 2002/0197344 A1 | 12/2002 | Takahashi | |
| 2005/0276874 A1 | 12/2005 | Menaldo et al. | |
| 2018/0319144 A1 * | 11/2018 | Faik | B32B 38/1866 |

FOREIGN PATENT DOCUMENTS

| | | |
|---|---|---|
| DE | 10152232 A1 | 5/2003 |
| DE | 102006038013 A1 | 2/2008 |
| DE | 102011050102 A1 | 11/2012 |
| DE | 102014008665 A1 | 12/2015 |
| DE | 102015219094 A1 | 4/2017 |
| WO | WO9206835 A1 | 4/1992 |
| WO | 2016024029 A1 | 2/2016 |

* cited by examiner

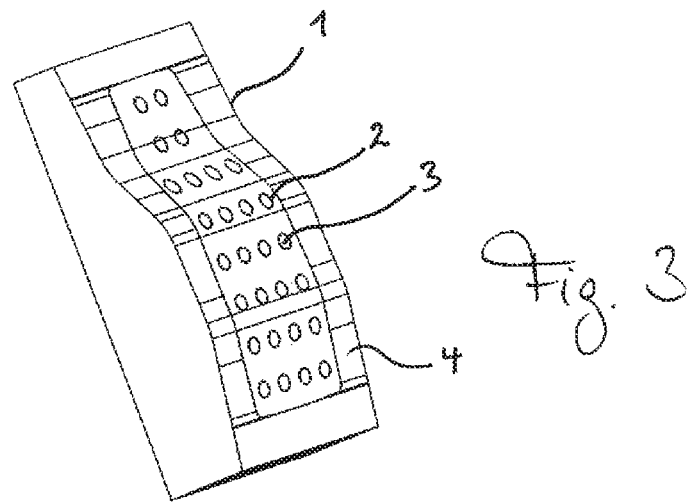
Fig. 3
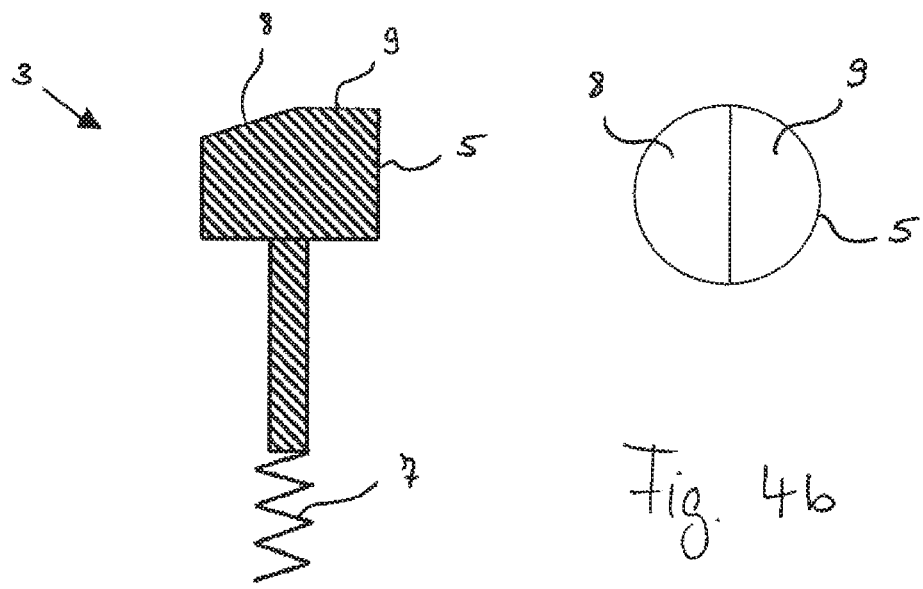
Fig. 4a
Fig. 4b

MOLDING TOOL AND METHOD FOR FORMING AND BACK-INJECTING A BENDABLE SHEET

CROSS-REFERENCE TO RELATED APPLICATION

This application claims priority to German Application No. 10 2016 226 214.9, filed Dec. 23, 2016, which is herein incorporated by reference in its entirety.

Technical Field

The present disclosure relates to a molding tool for forming and back-injecting a bendable sheet for a vehicle interior. In addition, the present disclosure relates to a method for forming and back-injecting a bendable sheet.

Background

Document US 2005/0276874 A1 relates to a device and method for manufacturing a veneer layer sheet. The veneer layer sheet comprises one layer of wood veneer or other decorative material bonded to one layer of a backing material. The veneer layer sheet is pre-formed prior to a final thermoplastic-material injection step that provides a required supporting and coupling layer.

In this method and in other methods a step of pre-forming is necessary. Therefore, known methods have a disadvantage of high process complexity and related costs.

SUMMARY

In view of the aforementioned state of the art, it is an objective of the present disclosure to provide a molding tool and a method to improve the fabrication of bent and back-injected flat materials. In particular, it is an objective of the disclosure to provide a tool which reduces process complexity. Another object of the disclosure may be to provide a tool that allows for back-injecting elastically deformable materials.

The proposed molding tool may be used for forming and back-injecting a bendable sheet for use in a vehicle interior. More in particular the tool may be used for forming and back-injecting an elastic sheet. The back injected sheet may be used for decorative purpose or for holding informative parts, for example, displays or instruments. The molding tool comprises a mold that comprises a first mold half and a second mold half. The first half is arranged opposite the second half and the two halves are forming a cavity for maintaining the bendable sheet and receiving a melt. Further, at least one of the halves comprises an opening or a groove for injecting a melt for back-injecting the bendable sheet. In addition, the molding tool comprises at least one pin for at least one of holding and positioning the bendable sheet and to form the sheet in a desired shape against the second mold half. The pin is elastically mounted to or in the first mold half and points towards the second half of the mold. Further, the pin is retractable in response to a force exerted on the pin by a pressure of the injected melt during back injection.

The pins may press the bendable sheet against the second half. During a closing phase of the mold, the pins may guide the deformation of the bendable sheet. Thus, the bendable sheet may be bent and may adopt the shape of the second mold half.

The proposed molding tool may comprise at least three retractable pins, preferably the pins are mounted in the half comprising the opening or the groove for injecting the melt. Thereby, the pins alone may hold the bendable sheet in a statically determined manner. When using three or more pins, an additional support, for example by a mold half, may not be necessary for holding the sheet. An additional support is particularly not necessary, when the sheet is positioned on top of the pins with respect to the gravitational force.

At least one of the pins may comprise a suction member at the end facing the second mold half for folding the bendable sheet. The suction member may prevent the bendable sheet from moving during forming and back-injecting. The suction member may also hold the bendable sheet when the second mold half is arranged below the first mold half, relative to the gravitational force.

According to a still further aspect of the disclosure, the application proposes a method for forming and back-injecting a bendable sheet using the aforementioned molding tool. The method may comprise the following steps, which do not need to be but may be performed in the listed order. The molding tool is provided. Further, a bendable sheet with a frontside and a backside is provided. The bendable sheet may be inserted into the cavity between the first half of the mold and the second half of the mold. For maintaining the bendable sheet at least one pin may be extended. In another step, the mold may be closed for bending the bendable sheet. During the closing process, the pin may perform at least one of hold the sheet in shape and bend the sheet and may be at least partially retracted. When the mold is closed, the pin may hold the sheet in shape by positioning the sheet against the second mold half. In another step, the melt is be injected under pressure to the backside of the bent sheet. The backside of the bent sheet is the side facing the first mold half. During the injection process, the melt may displace the pin such that the pin may be fully retracted into the first mold half. Thus, the bent sheet may be covered with a layer of the melt. The melt may also cover the backside of the bent sheet at the positions where the pins are retracted. In another step, the melt may be cured or cooled in order to solidify. Thus, the sheet may be held in shape by the back-injected layer. In general, the adhesion between the bendable sheet and the melt will be sufficient to hold the sheet in the desired form. An adhesion promoter may, however, be applied to the bendable sheet in order to provide a better adhesion. Otherwise an additional clamping part may fix the sheet to a part made out of the back-injected material, for example at the edge of the sheet.

The proposed molding tool and the proposed method enable a fast and reliable fabrication of a back-injected part. Two steps, the step of forming the sheet and the step of back-injecting the sheet can be performed with one tool. Further, the bent sheet is initially held in shape by the at least one pin, which holding function is taken over during the back-injection by the melt until the bent sheet is, at least mainly, supported by the back-injected layer. Known methods have the disadvantage that a sheet needs to be pre-formed in an additional tool. Therefore, the sheet must not be of an elastically deformable material, because it would loose its pre-formed shape when it is transferred from a tool for pre-forming to a tool for back-injecting. In the suggested tool, a forming and a back-injecting process may be performed in one tool and the sheet may be held in a deformed shape by at least one of at least one pin and the mold halves until it is supported by the back-injected layer. Thus, the sheet may be of an elastically deformable material.

When the mold is closed, the first mold half and the second mold half define the cavity for maintaining the bendable sheet and receiving the melt. Typically, the inner side of the second half of the mold has a shape corresponding to a visible side of the part, for example decorative covering component of a console, a door or an instrument panel. The mold also may include inserts for generating openings for knobs or buttons in consideration of the respective requirements. During the closing process, the mold halves may move towards each other. Only one mold half may move towards another mold half that is fixed relative to other parts of the tool or both mold halves may move relative to such other parts. The mold halves may apply a pressure to the bendable sheet. At least one of the mold halves, typically the first mold half and/or the pins may press the bendable sheet against one of the mold halves, typically the second mold half, and/or the extended pin to form the sheet in the desired shape. Sliders or parts of the first mold half may cover holes in the sheet or prevent the melt to reach specific areas of the sheet in order to obtain areas that are not covered by the melt.

Typically, the mold half comprising at least one pin further comprises at least one hole or bore to accommodate the pin. Preferably, the pin is placed in the hole or bore such that the pin may be completely retractable in the mold half. For retracting the pin elastically, the pin may comprise an elastically deformable material, for example a rubber. Additionally or alternatively, the pin may comprise a spring. Thus, during a closing process of the mold, the pin may maintain the bendable sheet and may be at least partially retracted.

In embodiments, at least one of: the spring of the pin may have a compression force that is inferior to the force exerted on the pin by the injected melt, and a spring compression force is superior to a force needed to form the bendable sheet. Thus, the pin may be able to bend the sheet and may be retracted, when the layer is supported by the back-injected layer.

The spring compression force may depend on one or more of the properties of the melt, the area covered by the melt, a cross-section of pins used, size of pins used and number of pins used.

In embodiments, at least one pin may comprise a tiltably mounted head. Thus, the pin can adapt better to the bendable sheet when positioned against the second mold half. The tiltably mounted head may be connected with a ball joint or a cylindrical joint. Therefore, during the closing phase of the mold, a retraction of the pin into the hole or bore may be simplified.

Furthermore, a top of at least one pin may be divided into sections. A first section of the top may hold the bendable sheet and a second section of the top may provide a retracting force. The first surface may be a distal end of the pin. The second section may be a surface that is inclined with respect to the moving direction of the pin in order to provide a ramp for a melt flow that is perpendicular or mainly perpendicular to the moving direction of the pin. The first section may be flat and the second section may be cut at an angle. Thus, a retracting process of the pin due to the injected melt may be improved. The melt may apply a pressure onto the angled surface of the pin while the flat surface may be in contact with the sheet. Therefore, the spring or the elastic material may be compressed due to the pressure and the pin may be retracted. The melt may pass the head of the pin covering the bent sheet. The distal end may also have another shape, for example it may be spheric.

During the back-injecting process, the melt may be injected under a pressure through the opening or the groove of one of the halves. In some embodiments, the pressure amounts to at least 100 bar, preferably at least 200 bar. In some embodiments, the pressure amounts to at most 2000 bar, preferably at most 1500 bar.

The injected melt may be a plastic material, in particular a thermoplastic material, for example a polyolefine such as polypropylene, a polyamide, ABS or vinyl polymers.

In embodiments, the material of the bendable sheet is glass or plastic. Using the suggested tool, bending and back-injecting a glass sheet may be enabled, because the pins may distribute the pressure for bending applied to the glass sheet. Of course, other sheet materials may be possible, for example PP, glass fibre, aluminium, plastic, wood, stone ceramic or acrylic glass.

In some embodiments, the thickness of the bendable sheet is at least 0.01 mm, preferably at least 0.05 mm, more preferably at least 0.1 mm. In some embodiments, the thickness of the bendable sheet is at most 3 mm, preferably 2 mm, more preferably 1 mm.

Moreover, the features mentioned in relation to the molding tool for forming and back-injecting a bendable sheet also relate to the method for forming and back-injecting a bendable sheet and vice versa.

BRIEF DESCRIPTION OF THE DRAWINGS

Exemplary embodiments will be described in conjunction with the following figures.

FIG. 3 shows a perspective view of the first half of the molding tool with retracted pins, according to embodiments of the disclosure, FIG. 4(a) shows a schematic view of the pin comprising a spring, according to embodiments of the disclosure, FIG. 4(b) shows a schematic top view of a head of the pin, according to embodiments of the disclosure.

DETAILED DESCRIPTION

Figure 1:
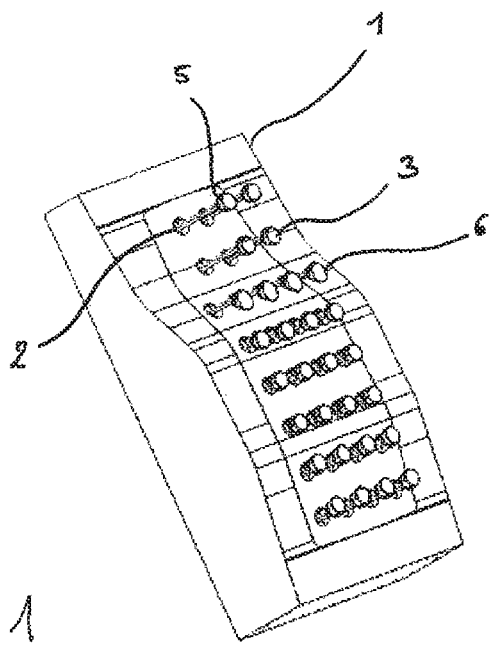
FIG. 1 shows a perspective view of a first half of a molding tool with extended pins, according to embodiments of the disclosure.

FIG. 1 shows a first mold half 1 of a molding tool for forming and back-injecting a bendable sheet. The first mold half 1 comprises bores 2 for accommodating retractable pins, as an example one of the pins is denoted with the reference sign 3. The pins 3 are shown in an extended position and point towards the second half of the mold (the second half of the mold is not shown). The first half of the mold 1 further comprises an opening for injecting a melt for back-injecting the bendable sheet. However, this opening is not shown in FIG. 1. The pins 3 comprise a tiltably mounted head 5 connected with a ball joint. However, in embodiments, the head 5 may be connected with a cylindrical joint. The head 5 comprises a low friction surface at its upper surface 6. Thus, a back-injected bent sheet comprising a layer of cured melt may be easily removed after a bending and back-injecting process. Corresponding features are denoted using the same reference signs in FIG. 2 and the following figures.

Figure 2:
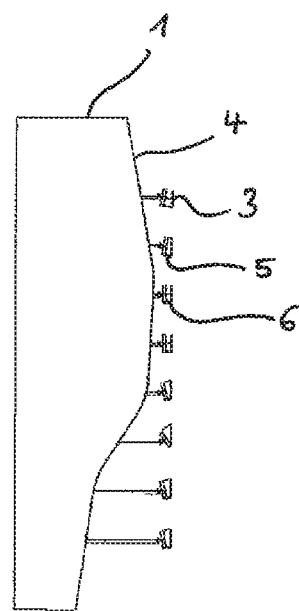
FIG. 2 shows a side view of the first half of the molding tool, according to embodiments of the disclosure.

In FIG. 2 the first mold half 1 is shown in a side view. The pins 3 are extended such that the pins can hold a bendable flat sheet. When the molding tool is open and the first and a second half of the mold have a maximum distance between each other, the pins 3 are extended in the shown position.

FIG. 3 shows the first mold half 1 with retracted pins 3. The pins 3 are completely embedded into the bores such that they do not protrude beyond the surface of the first mold half 1. During a closing phase of the mold, the sheet is bent (the bending process is described in more detail below). After the bending process, a melt is injected under pressure for back-injecting the bent sheet. Thereby, the melt displaces the pins by exerting a force on the pins. Therefore, the embedded position of the pins 3 shown in FIG. 3 corresponds to a closed position of the mold and after back-injecting the bent sheet. To enable a retraction of the pins 3, the pins 3 are mounted on a spring. However, in embodiments the pins 3 may be mounted elastically in a different way, for example by using an elastic material.

FIG. 4(a) illustrates a pin 3 comprising a head 5 and a spring 7. The head 5 of the pin 3 has a low friction surface, wherein the surface is divided into 2 sections 8, 9. Further, the surface of the pin is of a heat-resistant material, for example PTFE. The material of the different sections may differ from each other. The first section 8 is cut at an angle of 20 degrees. The section second 9 is flat. Thus, a retracting process of the pin 3 due to the injected melt may be improved. The melt can apply a pressure onto the angled section 8 while the flat section 9 may stay in contact with the bent sheet. The flat section 9 may have another shape that fits better to the shape of the bendable sheet after bending. Due to the pressure applied on the first section, the spring 7 can be compressed and the pin may be retracted, losing the contact with the bent sheet. The melt may pass the head of the pin covering the bent sheet.

FIG. 4(b) shows a top view of the head 5 of the pin 3. The first section 8 is cut at the mentioned angle and the second section 9 is flat. This head 5 of the pin 3 comprises two sections 8, 9 each forming a semicircle. However, in embodiments the head 5 may comprise at least one of more sections cut at different angles and having other shapes. The head may have a spheric shape or any shape that allows the force provided by the melt front to be, at least partly, transferred into the retraction direction of the pin. In FIG. 4(b) the diameter of the head 5 of the pin 3 amounts to 10 mm. However, the heads 5 of the pins 3 may have other diameters. A diameter of a bore 2 matches the diameter of the pins head 5, such that the pins 3 are retractable. A gap between the pins 3 and the surface 4 of the first mold half 1 may be sealed, such that melt may not enter the bore when the pins 3 are retracted and the melt is injected.

Figure 5A:
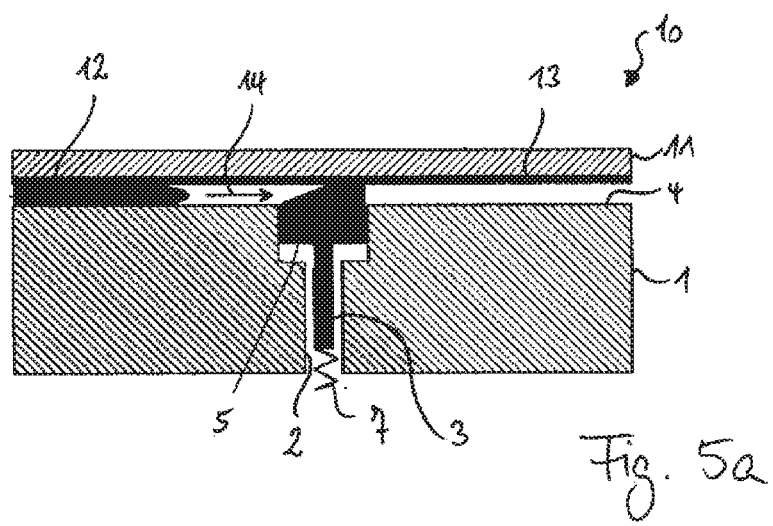
FIG. 5(a) shows a schematic sectional view of the closed molding tool with the extended pin during an injection process, according to embodiments of the disclosure.

FIG. 5(a) shows a closed mold 10 comprising the first mold half 1 and the second mold half 11 when a melt 12 is injected. The melt is a polypropylene. The bendable sheet 13 is arranged between the mold halves and the pins 3 maintain the bent sheet 11. More in particular, the sheet is positoned against the second mold half. Therefore, the pin 3 is partly extended and the head 5 of the pin 3 protrudes at least partially beyond the surface 4 of the first mold half 1. The arrow 14 shows the flow direction of the melt. The inclined surface of the pin is directed towards the melt front.

Figure 5B:
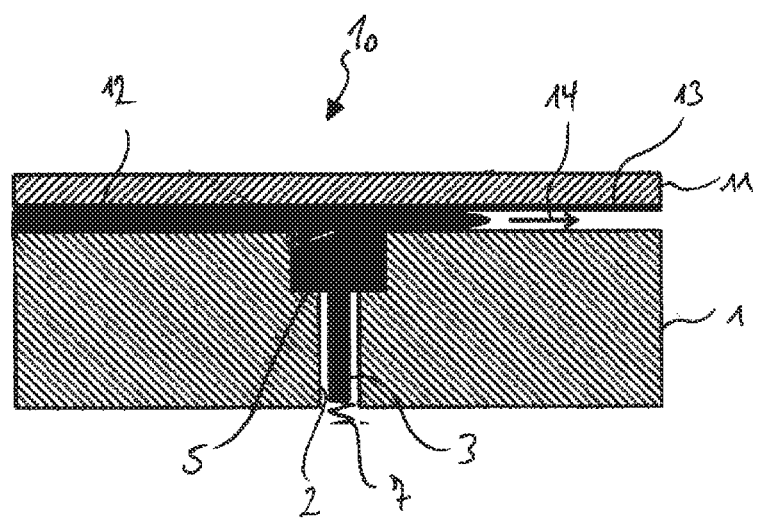
FIG. 5(b) shows a schematic sectional view of the closed molding tool with the completely retracted pin during an injection process, according to embodiments of the disclosure, FIG. 6(a) to show a schematic sectional view of the molding tool during a FIG. 6(c) bending process, according to embodiments of the disclosure.

FIG. 5(b) shows a schematic snapshot of an injection process, after the melt has displaced the pin 3. The pin 3 is retracted due to a force exerted on the surface of the head 5 of the pin 3 by the melt 12. The force compresses the spring 7 and the pin 3 is pressed into the bore 2 of the first mold half 1. In embodiments, an injection pressure amounts to 800 bars.

The example of mold 10 shown in the FIGS. 1 and 3 comprises twenty-eight pins 3 with a diameter of the head 5 of 10 mm.

Figure 6A:
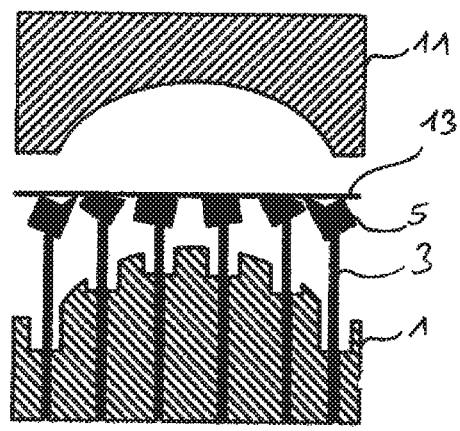
Figure 6B:
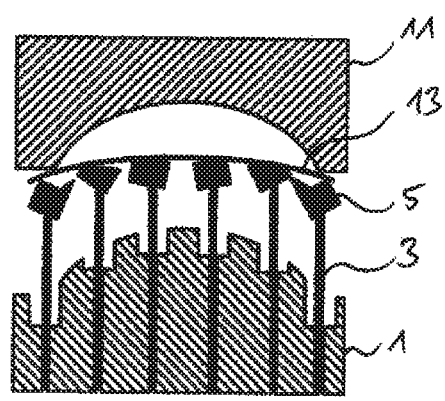
Figure 6C:
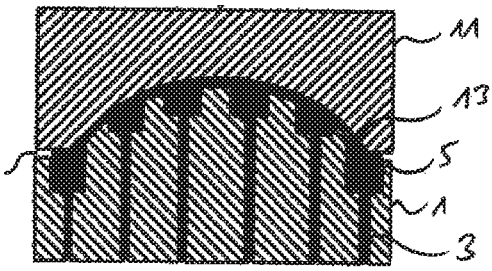

FIGS. 6(a), 6(b) and 6(c) show snapshots of a bending process of a bendable sheet 13 with the molding tool. In FIG. 6(a) the molding tool is opened and the pins 3 are extended. A bendable sheet 13 is positioned between the first half 1 of the mold and the second half 11 of the mold. The pins 3 maintain the bendable sheet 13. In this example, the bendable sheet is a glass sheet. In the example shown, the thickness of the bendable sheet 13 is 0.8 mm. However, in embodiments, the bendable sheet 13 can have another thickness.

FIG. 6(b) shows a mold-closing step during the bending process, in which the pins 3 hold in position the glass sheet. The second half 11 of the mold moves toward the first half 1 of the mold. Thereby, the second mold half 11 applies at least locally a pressure to the bendable sheet 13. Where the pressure is too high, the retractable pins 3 can retract at least partly to avoid a damage of the bendable sheet because of local stresses. Further, the pins 3 comprise tiltably mounted heads 5, such that they are able to hold the sheet in position even though it is no longer in a flat shape.

FIG. 6(c) shows a closed position of the molding tool, when the bending process is finished. The bendable sheet 13 is bent and adapted its shape to the shape of the mold. Between the first half 1 and the second half 11 of the mold is still a cavity for injecting the melt. The pins 3 are at least partially protruding beyond the surface of the first half 1 of the mold to hold the bent sheet 13 in shape. In another step the melt 12 will be injected into the cavity 15 to back-inject the bent sheet 13 (as described in FIGS. 5(a) and 5(b)).

If the gravitational force in the FIGS. 6(a), 6(b) and 6(c) is in the direction from the second mold half to the first mold half than the sheet may be solely supported by the pins. In other geometries, for example when the gravitational force is directed from the first mold half to the second mold half, additional support for the sheet is needed. Such additional support may be an edge of the second mold half. In a geometry where the gravitational force is in a direction parallel to the sheet, additional clamping of the sheet may be foreseen, for example suction pads or clamps in the head of the pins.

Figure 7A:
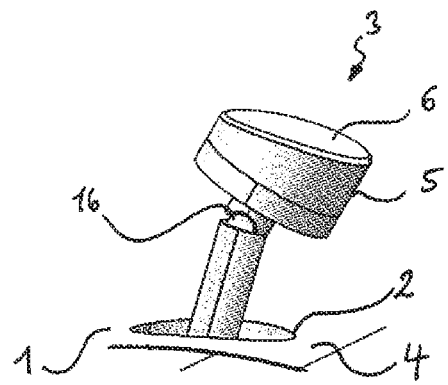
FIG. 7(a) shows a perspective view of an extended pin, according to embodiments of the disclosure.
Figure 7B:
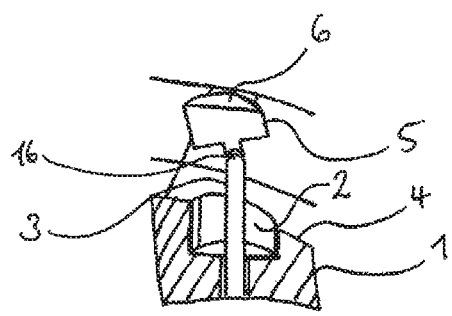
FIG. 7(b) shows a schematic view of the extended pin, according to embodiments of the disclosure.

FIGS. 7(a) and 7(b) illustrate an extended pin 3 in a perspective view and a schematic view. The pin comprises a tiltably mounted head 5 that is connected with a cylindrical joint 16. An upper surface 6 of the shown pin 3 only comprises one section that is angled with respect to the melt flow direction. A bore 2 comprises a diameter that complies with the diameter of the head 5. Therefore, the pin 3 is completely embeddable into the mold half 1. A tiltably mounted head may improve the application of the sheet to the second mold half.

We claim:

1. A molding tool for forming and back-injecting a bendable sheet comprising:
   a mold, comprising a first mold half and a second mold half, wherein the first mold half is arranged opposite the second mold half forming a cavity for receiving the bendable sheet and a melt; and
   at least one pin for holding the bendable sheet against the second mold half, wherein the at least one pin is elastically mounted to or in the first mold half and points towards the second mold half; and
   wherein the at least one pin is retractable into the first mold half in response to a force exerted on the at least one pin by a pressure of the injected melt during back injecting the bendable sheet; and
   wherein the at least one pin includes a tiltably mounted head.

2. The molding tool of claim 1, wherein the molding tool comprises at least three retractable pins.

3. The molding tool of claim 1, wherein at least one retractable pin comprises a spring.

4. The molding tool of claim 3, wherein at least one of a spring compression force of the spring is inferior to the force exerted on the retractable pin by the injected melt and a spring compression force is superior to a force needed to form the bendable sheet.

5. The molding tool of claim 1, wherein the at least one pin comprises a suction pad for holding the bendable sheet.

6. The molding tool of claim 1, wherein the tiltably mounted head is connected with a ball joint or a cylindrical joint.

7. The molding tool of claim 1, wherein a top of the at least one pin is divided into sections, wherein at least one section is flat and at least another section is cut at an angle.

8. The molding tool of claim 1, wherein the melt is a plastic material.

9. The molding tool of claim 1, wherein the material of the bendable sheet comprises glass, metal, wood or plastic.

10. A method for forming and back-injecting a bendable sheet using a molding tool comprising the steps of:
    providing the molding tool;
    providing a bendable sheet with a frontside and a backside;
    inserting the bendable sheet into a cavity between a first half of a mold and a second half of the mold;
    closing the mold for bending the bendable sheet, wherein at least one pin is maintaining the sheet and is at least partially retracted during the closing process;
    holding the sheet in shape;
    injecting a melt under pressure on the backside of the bent sheet, wherein the at least one pin is retracted due to a force exerted on the at least one pin by the injected melt and wherein the at least one pin includes a tiltably mounted head; and
    curing the melt.

11. The method of claim 10, wherein the at least one pin comprises a spring with a compression force, wherein at least one of the force exerted on the at least one pin by the injected melt is superior to the compression force and the spring compression force is superior to a force needed to form the bendable sheet.

* * * * *